(12) United States Patent
Qian

(10) Patent No.: US 9,692,667 B2
(45) Date of Patent: Jun. 27, 2017

(54) STREAM PROCESSING METHOD, APPARATUS, AND SYSTEM

(71) Applicant: Huawei Technologies Co., Ltd., Shenzhen (CN)

(72) Inventor: Jianfeng Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 14/744,815

(22) Filed: Jun. 19, 2015

(65) Prior Publication Data

US 2015/0372882 A1 Dec. 24, 2015

(30) Foreign Application Priority Data

Jun. 23, 2014 (CN) .......................... 2014 1 0284343

(51) Int. Cl.
*H04L 12/24* (2006.01)
*H04L 29/06* (2006.01)
*G06F 9/50* (2006.01)

(52) U.S. Cl.
CPC ........ *H04L 41/5054* (2013.01); *G06F 9/5027* (2013.01); *G06F 9/5061* (2013.01); *H04L 65/4069* (2013.01); *H04L 65/605* (2013.01)

(58) Field of Classification Search
None
See application file for complete search history.

(56) References Cited

U.S. PATENT DOCUMENTS 5,925,102 A * 7/1999 Eilert .................... G06F 9/4887
709/200
7,990,968 B2 * 8/2011 Rodgers ............... H04N 21/434
370/392

(Continued)

FOREIGN PATENT DOCUMENTS

CN 102904919 A 1/2013
CN 103595651 A 2/2014

(Continued)

OTHER PUBLICATIONS

Khandekar et al., "COLA: Optimizing Stream Processing Applications via Graph Partitioning," Middelware 2009, pp. 308-327, Springer Berlin Heidelberg, Heidelberg, Germany (2009).

*Primary Examiner* — Thomas Dailey
(74) *Attorney, Agent, or Firm* — Leydig, Voit & Mayer, Ltd.

(57) ABSTRACT

The invention discloses a stream processing method, which includes: receiving a first stream processing task including one or more stream processing components, a data input and output relationship of the stream processing component, and an identifier of a stream data source; calculating a computing resource required by each stream processing component; and if the first stream processing task includes a first stream processing component which does not meet a preset constraint condition, duplicating the first stream processing component to obtain at least one second stream processing component, so that the data may be allocated to the first stream processing component and the second stream processing component(s), which reduce a probability that system instability and a data processing fault are caused.

18 Claims, 5 Drawing Sheets

(56) References Cited

U.S. PATENT DOCUMENTS

| | | | |
|---|---|---|---|
| 8,131,840 B1* | 3/2012 | Denker | H04L 67/2819 |
| | | | 370/252 |
| 2007/0091930 A1* | 4/2007 | Yu | H04B 1/662 |
| | | | 370/474 |
| 2007/0136239 A1 | 6/2007 | Lee et al. | |
| 2008/0062886 A1* | 3/2008 | Tang | H04L 12/5695 |
| | | | 370/252 |
| 2008/0304516 A1* | 12/2008 | Feng | G06F 9/5038 |
| | | | 370/468 |
| 2012/0167103 A1 | 6/2012 | Kim et al. | |
| 2014/0067900 A1 | 3/2014 | Fukumura | |
| 2016/0092317 A1* | 3/2016 | Akiyama | H04L 1/0084 |
| | | | 714/20 |

FOREIGN PATENT DOCUMENTS

| | | |
|---|---|---|
| CN | 103782270 A | 5/2014 |
| WO | WO 2013145310 A1 | 10/2013 |

* cited by examiner

STREAM PROCESSING METHOD, APPARATUS, AND SYSTEM

CROSS-REFERENCE TO RELATED APPLICATIONS

This application claims priority to Chinese Patent Application No. 201410284343.5, filed on Jun. 23, 2014, which is hereby incorporated by reference in its entirety.

TECHNICAL FIELD

The present invention relates to the field of computer technologies, and in particular, to a stream processing method, apparatus, and system.

BACKGROUND

A stream processing technology is widely applied to real-time processing systems of various fields, for example, a stock and securities trading center, network surveillance, a web application, and communications data management. A common feature of the systems of this type is that data is of strong real-time performance, in an extremely large amount, occurs unexpectedly and continuously, and keeps changing. The stream processing technology needs to monitor continuous data streams in real time, perform data analysis in real time when data keeps changing, and capture information that may be useful for users, so as to quickly respond to an emergency, and perform real-time processing.

At present, a distributed computing manner is mainly used for stream data processing. A distributed stream processing system includes multiple computing nodes, and a processing procedure of stream data may be completed by the multiple computing nodes. After a user submits a stream processing task, the distributed stream processing system allocates stream processing components in the stream processing task to the multiple computing nodes, where the stream processing component includes computing logic of data, so that the multiple computing nodes can perform processing on the stream data according to the computing logic of the stream processing component obtained by means of allocation.

However, when the foregoing distributed stream processing system is used to process stream data, a case often occurs in which a computing resource that is required by a stream processing component distributed on a computing node exceeds a computing resource that can be provided by the computing node, which easily causes system instability and a data processing fault, and therefore, system performance deteriorates.

SUMMARY

Embodiments of the present invention provide a stream processing method, apparatus, and system, which are used to allocate a stream processing component included in a stream processing task and can effectively decrease a probability that system instability and a data processing fault are caused because a computing resource required by a stream processing component that is allocated to a computing node exceeds a computing resource that can be provided by the computing node, thereby improving system performance.

A first aspect of the present invention provides a stream processing method, where the method includes:

receiving a first stream processing task, where the first stream processing task includes one or more stream processing components, a data input and output relationship of the stream processing component, and an identifier of a stream data source;

calculating a computing resource required by each stream processing component of the one or more stream processing components included in the first stream processing task;

if the first stream processing task includes a first stream processing component, where the computing resource required by the first stream processing component does not meet a preset constraint condition, obtaining, by duplicating the first stream processing component, a second stream processing component that has same computing logic as the first stream processing component, where there is one or more second stream processing components, and adding the second stream processing component to the first stream processing task to obtain a second stream processing task; where in the second stream processing task, the second stream processing component has a same data input and output relationship as the first stream processing component;

if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy; and allocating a stream processing component in the second stream processing task to a computing node that is in a stream processing system and meets a computing resource required by the stream processing component.

In a first possible implementation manner of the first aspect, the first stream processing task further includes an estimated amount of operator computation and an estimated amount of computation for stream transmission that are of a stream processing component; and the calculating a computing resource required by each stream processing component in the first stream processing task includes:

calculating, according to an estimated amount of operator computation and an estimated amount of computation for stream transmission that are of each stream processing component in the first stream processing task, the computing resource required by each stream processing component.

With reference to the first possible implementation manner of the first aspect, in a second possible implementation manner of the first aspect, the calculating, according to an estimated amount of operator computation and an estimated amount of computation for stream transmission that are of each stream processing component in the first stream processing task, the computing resource required by each stream processing component includes:

calculating, according to the estimated amount of operator computation of each stream processing component and an estimated amount of computation for source code of the stream processing component, an amount of operator computation of each stream processing component by using a preset prediction function of an amount of operator computation;

calculating, according to the estimated amount of computation for stream transmission of each stream processing component, an amount of computation for stream transmission of each stream processing component by using a preset prediction function of an amount of computation for stream transmission; and using a sum of the amount of operator computation of each stream processing component and the amount of computation for stream transmission of each stream processing component as the computing resource required by each stream processing component.

With reference to the first aspect, or the first possible implementation manner of the first aspect, or the second possible implementation manner of the first aspect, in a third possible implementation manner of the first aspect, the allocating a stream processing component in the second stream processing task to a computing node that is in a stream processing system and meets a computing resource required by the stream processing component includes:

sorting stream processing components according to a descending order of computing resources required by the stream processing components in the second stream processing task; and allocating, according to the sorting, the stream processing component to the computing node that is in the stream processing system and meets the computing resource required by the stream processing component, where the computing node is a computing node on which the stream processing component has smallest computing resource proportion among all computing nodes, and the computing resource proportion is proportion of a sum of the computing resource required by the stream processing component and a computing resource already used on the computing node to total computing resources of the computing node.

With reference to the first aspect, or the first possible implementation manner of the first aspect, or the second possible implementation manner of the first aspect, in a fourth possible implementation manner of the first aspect, the allocating a stream processing component in the second stream processing task to a computing node that is in a stream processing system and meets a computing resource required by the stream processing component includes:

determining a type of the second stream processing task according to a preset classification model;

searching a preset mapping relationship table of a task type and an allocation manner to determine an allocation manner corresponding to the type of the second stream processing task; and allocating, for the stream processing component in the second stream processing task according to the allocation manner, the computing node that meets the computing resource required by the stream processing component.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect, the constraint condition is that the computing resource required by a stream processing component is less than or equal to a preset value, or that the computing resource required by the stream processing component is less than a greatest idle computing resource among all idle computing resources that can be provided by all computing nodes, or that the computing resource required by the stream processing component is less than an average value of idle computing resources of all computing nodes.

With reference to the first aspect, or the first possible implementation manner of the first aspect, or the second possible implementation manner of the first aspect, or the third possible implementation manner of the first aspect, or the fourth possible implementation manner of the first aspect, in a sixth possible implementation manner of the first aspect, the first data allocation policy is an average allocation policy, the second data allocation policy is an average allocation policy, and the resource allocation policy is an average allocation policy.

A second aspect of the present invention provides a stream processing apparatus, including:

a receiving unit, configured to receive a first stream processing task, where the first stream processing task includes one or more stream processing components, a data input and output relationship of the stream processing component, and an identifier of a stream data source;

a calculating unit, configured to: after the receiving unit receives the first stream processing task, calculate a computing resource required by each stream processing component of the one or more stream processing components included in the first stream processing task;

a duplicating and updating unit, configured to: after the calculating unit obtains the computing resource required by each stream processing component, if the first stream processing task includes a first stream processing component, where the computing resource required by the first stream processing component does not meet a preset constraint condition, obtain, by duplicating the first stream processing component, a second stream processing component that has same computing logic as the first stream processing component, where there is one or more second stream processing components, and add the second stream processing component to the first stream processing task to obtain a second stream processing task; where in the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy; and an allocation unit, configured to: after the duplicating and updating unit obtains the second stream processing task, allocate a stream processing component in the second stream processing task to a computing node that is in the stream processing system and meets a computing resource required by the stream processing component.

In a first possible implementation manner of the second aspect, the first stream processing task further includes an estimated amount of operator computation of a stream processing component and an estimated amount of computation for stream transmission of the stream processing component; and the calculating unit is specifically configured to calculate, according to an estimated amount of operator computation of each stream processing component in the first stream processing task and an estimated amount of computation for stream transmission of the stream processing component, the computing resource required by each stream processing component.

With reference to the first possible implementation, in the second possible implementation manner of the second aspect, the calculating unit includes:

a first calculating unit, configured to: after the receiving unit receives the first stream processing task, calculate, according to the estimated amount of operator computation of each stream processing component and an estimated amount of computation for source code of the stream processing component, an amount of operator computation of each stream processing component by using a preset prediction function of an amount of operator computation;

a second calculating unit, configured to: after the first calculating unit calculates the amount of operator computation of each stream processing component, calculate, according to the estimated amount of computation for stream transmission of each stream processing component, an amount of computation for stream transmission of each stream processing component by using a preset prediction function of an amount of computation for stream transmission; and a third calculating unit, configured to: after the second calculating unit calculates the amount of computation for stream transmission of each stream processing component, use a sum of the amount of operator computation of each stream processing component and the amount of computation for stream transmission of each stream processing component as the computing resource required by each stream processing component.

With reference to the second aspect, or the first possible implementation manner of the second aspect, or the second possible implementation manner of the second aspect, in a third possible implementation manner of the second aspect, the allocation unit includes:

a sorting unit, configured to: after the duplicating and updating unit obtains the second stream processing task, sort stream processing components according to a descending order of computing resources required by the stream processing components in the second stream processing task; and a component allocation unit, configured to: after the sorting unit performs sorting, allocate, according to the sorting, the stream processing component to the computing node that is in the stream processing system and meets the computing resource required by the stream processing component, where the computing node is a computing node on which the stream processing component has smallest computing resource proportion among all computing nodes, and the computing resource proportion is proportion of a sum of the computing resource required by the stream processing component and a computing resource already used on the computing resource node to total computing resources of the computing node.

With reference to the second aspect, or the first possible implementation manner of the second aspect, or the second possible implementation manner of the second aspect, in a fourth possible implementation manner of the second aspect, the allocation unit includes:

a determining unit, configured to: after the duplicating and updating unit obtains the second stream processing task, determine a type of the second stream processing task according to a preset classification model;

a searching unit, configured to: after the determining unit determines the type of the second stream processing task, search a preset mapping relationship table of a task type and an allocation manner to determine an allocation manner corresponding to the type of the second stream processing task; and a node allocation unit, configured to: after the searching unit determines the corresponding allocation manner, allocate, for the stream processing component in the second stream processing task according to the corresponding allocation manner, the computing node that meets the computing resource required by the stream processing component.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner of the second aspect, the constraint condition is that a computing resource required by a stream processing component is less than or equal to a preset value, or that the computing resource required by the stream processing component is less than a computing resource that can be provided by a computing node having a greatest remaining computing resource in all computing nodes, or that the computing resource required by the stream processing component is less than an average value of remaining computing resources of all computing nodes.

With reference to the second aspect, or the first possible implementation manner of the second aspect, or the second possible implementation manner of the second aspect, or the third possible implementation manner of the second aspect, or the fourth possible implementation manner of the second aspect, in a sixth possible implementation manner of the second aspect, the first data allocation policy is an average allocation policy, the second data allocation policy is an average allocation policy, and the resource allocation policy is an average allocation policy.

A third aspect of the present invention provides a stream processing system, including a stream processing apparatus and multiple computing nodes, where:

the stream processing apparatus is configured to: receive a first stream processing task, where the first stream processing task includes one or more stream processing components, a data input and output relationship of the stream processing component, and an identifier of a stream data source; calculate a computing resource required by each stream processing component of the one or more stream processing components included in the first stream processing task; and if the first stream processing task includes a first stream processing component, where the computing resource required by the first stream processing component does not meet a preset constraint condition, obtain, by duplicating the first stream processing component, a second stream processing component that has same computing logic as the first stream processing component, where there is one or more second stream processing components, and add the second stream processing component to the first stream processing task to obtain a second stream processing task; where in the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy; and the computing node is configured to: receive a stream processing component allocated by the stream processing apparatus, and process, according to computing logic of the stream processing component, data that is sent to the stream processing component.

In a first possible implementation manner of the third aspect, the first stream processing task further includes an estimated amount of operator computation and an estimated amount of computation for stream transmission that are of a stream processing component; and the stream processing component is specifically configured to: calculate, according to an estimated amount of operator computation of each stream processing component and an estimated amount of computation for source code of the stream processing component, an amount of operator computation of each stream processing component by using a preset prediction function of an amount of operator computation; calculate, according to an estimated amount of computation for stream transmission of each stream processing component, an amount of computation for stream transmission of each stream processing component by using a preset prediction function of an amount of computation for stream transmission; and use a sum of the amount of operator computation of each stream processing component and the amount of computation for stream transmission of each stream processing component as the computing resource required by each stream processing component.

With reference to the third aspect or the first possible implementation manner of the third aspect, in a second possible implementation manner of the third aspect, the constraint condition is that the computing resource required by a stream processing component is less than or equal to a preset value, or that the computing resource required by the stream processing component is less than a greatest idle computing resource among all idle computing resources that can be provided by all computing nodes, or that the computing resource required by the stream processing component is less than an average value of idle computing resources of all computing nodes.

With reference to the third aspect or the first possible implementation manner of the third aspect, in a third possible implementation manner of the third aspect, the first data allocation policy is an average allocation policy, the second data allocation policy is an average allocation policy, and the resource allocation policy is an average allocation policy.

It can be seen from the foregoing technical solutions that the embodiments of the present invention have the following advantages:

A stream processing apparatus receives a first stream processing task, where the first stream processing task includes one or more stream processing components, a data input and output relationship of the stream processing component, and an identifier of a stream data source; calculates a computing resource required by each stream processing component in the first stream processing task; if the first stream processing task includes a first stream processing component, where the computing resource required by the first stream processing component does not meet a preset constraint condition, obtains, by duplicating the first stream processing component, a second stream processing component that has same computing logic as the first stream processing component, where there is one or more second stream processing components, and adds the second stream processing component to the first stream processing task to obtain a second stream processing task; where in the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy; and allocates a stream processing component in the second stream processing task to a computing node that is in a stream processing system and meets a computing resource required by the stream processing component. At least one second stream processing component that has the same computing logic as the first stream processing component is obtained by duplicating the first stream processing component, so that data originally inputted to the first stream processing component may be allocated to the first stream processing component and the second stream processing component, which decreases the computing resource required by the first stream processing component and avoids, to a certain degree, a probability that system instability and a data processing fault are caused because a computing resource required by a stream processing component that is allocated to a computing node exceeds a computing resource that can be provided by the computing node, thereby improving system performance.

DESCRIPTION OF EMBODIMENTS

Embodiments of the present invention provide a stream processing method, apparatus, and system, which are used to allocate a stream processing component included in a stream processing task and can effectively decrease a probability that system instability and a data processing fault are caused because a computing resource required by a stream processing component that is allocated to a computing node exceeds a computing resource that can be provided by the computing node, thereby improving system performance.

The following provides detailed descriptions separately by using specific embodiments.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein, for example, can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
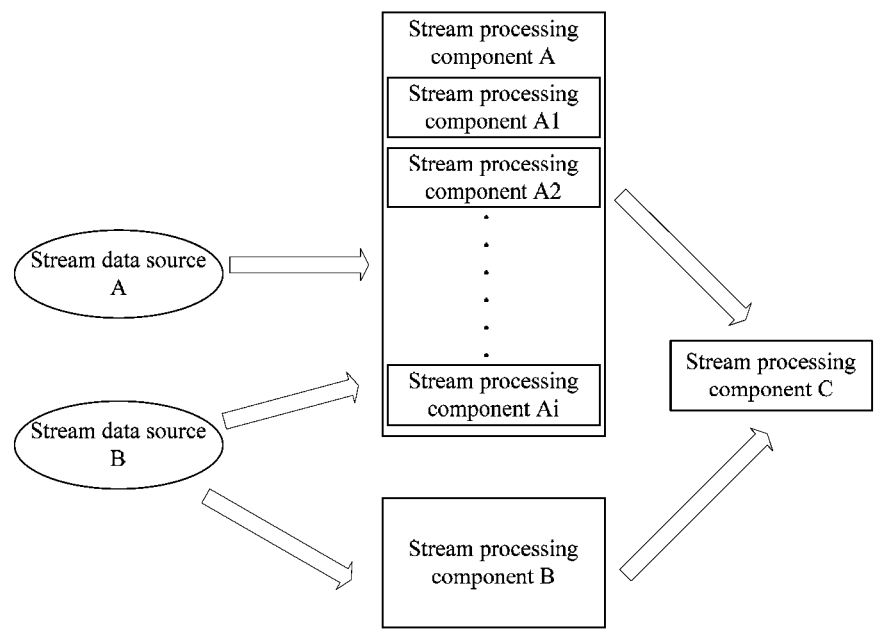
FIG. 1 is a schematic diagram of a stream processing task in the prior art.

Referring to FIG. 1, FIG. 1 is a schematic diagram of a stream processing task in the prior art. A stream processing component may receive output data of a stream data source or another stream processing component. The stream data source provides a data stream. The stream data source includes stream data sources A and B, where output data of stream data source A is sent to stream processing component A, output data of stream data source B is sent to stream processing components A and B, and stream processing components A and B send the output data to stream processing component C. A stream processing component may be constituted by multiple stream processing components. In FIG. 1, the stream processing component includes stream processing components A1 to Ai.

Figure 2:
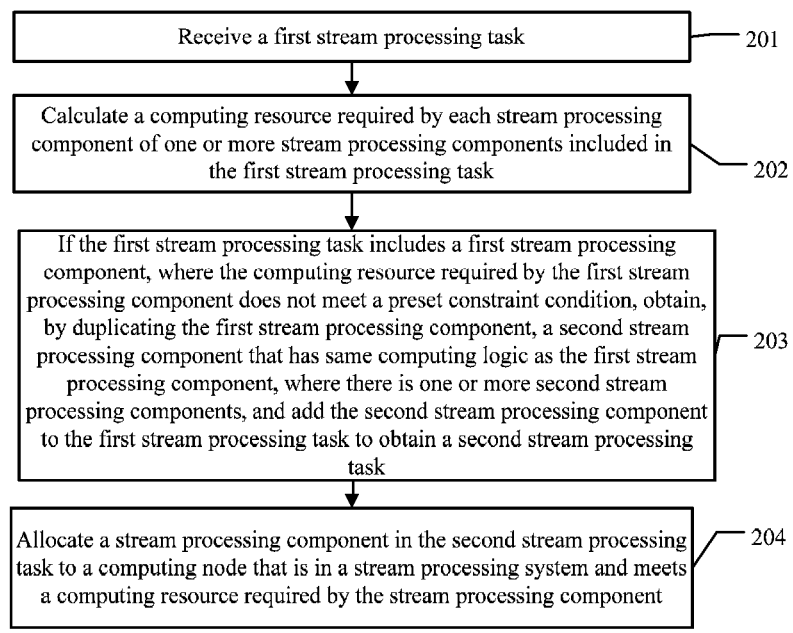
FIG. 2 is a schematic diagram of a stream processing method according to an embodiment of the present invention.

Referring to FIG. 2, FIG. 2 shows a stream processing method according to an embodiment of the present invention. The stream processing method is applied to a stream processing apparatus. The method includes:

201. Receive a first stream processing task.

In the embodiment of the present invention, a user may submit the first stream processing task to the stream processing apparatus, where the first stream processing task includes one or more stream processing components, a data input and output relationship of the stream processing component, and an identifier of a stream data source. In addition, the first stream processing task may further include an identifier of a storage device. The stream processing component carries computing logic for processing data. For example, the computing logic may be data filtering, summation, averaging, and eigenvalue selection. The data input and output relationship of the stream processing component means that input data of the stream processing component is inputted by which stream processing component or stream data source, and that output data of the stream processing component is sent to which stream processing component or storage device; or the data input and output relationship of the stream processing component means that input data of the stream processing component is inputted by which stream processing component and stream data source, and that output data of the stream processing component is sent to which stream processing component or storage device. For example, stream processing component A and stream data source B input data to stream processing component C, and the data is sent to stream processing component D by passing through stream processing component C. In this case, an input relationship of stream processing component C includes stream processing component A and a stream data source B, and an output relationship of stream processing component C includes stream processing component D.

202. Calculate a computing resource required by each stream processing component of one or more stream processing components included in the first stream processing task.

In the embodiment of the present invention, the stream processing apparatus may calculate the computing resource required by each stream processing component of the one or more stream processing components included in the first stream processing task, which may specifically be that the stream processing apparatus calculates, according to a preset prediction function, the computing resource required by each stream processing component in the first stream processing task. The preset prediction function may be set according to a requirement, which is not limited in the embodiment of the present invention.

203. If the first stream processing task includes a first stream processing component, where the computing resource required by the first stream processing component does not meet a preset constraint condition, obtain, by duplicating the first stream processing component, a second stream processing component that has same computing logic as the first stream processing component, where there is one or more second stream processing components, and add the second stream processing component to the first stream processing task to obtain a second stream processing task.

In the embodiment of the present invention, after the stream processing apparatus obtains the computing resource required by each stream processing component in the first stream processing task, if the first stream processing task includes the first stream processing component, where the computing resource required by the first stream processing component does not meet the preset constraint condition, the stream processing apparatus obtains, by duplicating the first stream processing component, the second stream processing component that has the same computing logic as the first stream processing component, where there is one or more second stream processing components, and adds the second stream processing component to the first stream processing task to obtain the second stream processing task. In the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy.

In the embodiment of the present invention, the first data allocation policy may be an average allocation policy. In this case, if the third stream processing component that sends the data to the first stream processing component exists in the first stream processing task, the third stream processing component sends, to the first stream processing component and the second stream processing component according to the average allocation policy, the data to be sent by the third stream processing component to the first stream processing component. For example, if the computing resource required by the first stream processing component in the first stream processing task is K, and a sum of a quantity of the first stream processing component and a quantity of the second stream processing component that has the same computing logic as the first stream processing component in the second stream processing task is N, a computing resource required by either of the first stream processing component and the second stream processing component in the second stream processing task is K/N.

The second data allocation policy may also be an average allocation policy. In this case, if the stream data source that corresponds to the identifier of the stream data source and sends the data to the first stream processing component exists in the first stream processing task, the stream data source sends, to the first stream processing component and the second stream processing component according to the average allocation policy, the data to be sent by the stream data source to the first stream processing component.

When both the first data allocation policy and the second data allocation policy are average allocation policies, the resource allocation policy may also be an average allocation policy. In this case, the computing resource required by the first stream processing component in the first stream processing task is divided for the first stream processing component and the second stream processing component in the second stream processing task according to the average allocation policy.

It should be noted that in the embodiment of the present invention, the first data allocation policy may also be a random allocation policy, a parity allocation policy, a policy for allocation based on a preset proportion, or the like; the second data allocation policy may also be a random allocation policy, a parity allocation policy, a policy for allocation based on a preset proportion, or the like; the first data allocation policy and the second data allocation policy may be the same or may be different.

It should be noted that in the embodiment of the present invention, the resource allocation policy is related to the first data allocation policy and the second data allocation policy. For example, if both the first data allocation policy and the second data allocation policy are average allocation policies, the resource allocation policy is also an average allocation policy; if the first data allocation policy is a random allocation policy and the second data allocation policy is a parity allocation policy, the resource allocation policy is an average allocation policy.

Figure 3A:
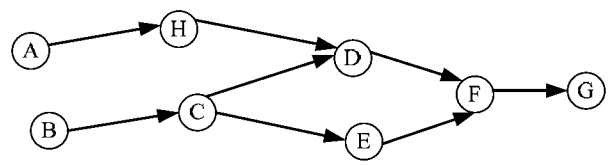
FIG. 3a is a schematic diagram of a first stream processing task according to an embodiment of the present invention.
Figure 3B:
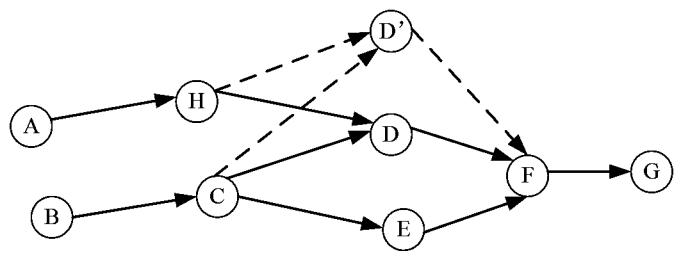
FIG. 3b is a schematic diagram of a second stream processing task according to an embodiment of the present invention.

For a better understanding, reference may be made to FIG. 3a. FIG. 3a is a schematic structural diagram of an example of a first stream processing task according to the embodiment of the present invention. Nodes A and B each represent a stream data source; nodes C, D, E, F, and H each represent a stream processing component; a direction of an arrow represents a flow direction of data; and node G represents a storage device. If a computing resource required by node D does not meet a preset constraint condition, a stream processing component that has same computing logic as node D is obtained by duplicating node D, so as to obtain a second stream processing task, where the stream processing component is represented as node D'. Referring to FIG. 3b, FIG. 3b is a schematic structural diagram of an example of a second stream processing task according to the embodiment of the present invention. In FIG. 3b, node D' and node D have a same data input and output relationship, and nodes C and H send data to nodes D and D' according to an average allocation policy, where nodes C and H are located at an upper layer of node D.

In the embodiment of the present invention, the constraint condition may be preset according to a specific requirement. For example, the preset constraint condition may be that a computing resource required by a stream processing component is less than or equal to a preset value, or that a computing resource required by a stream processing component is less than a greatest idle computing resource among all idle computing resources that can be provided by all computing nodes in the stream processing apparatus, or that a computing resource required by a stream processing component is less than an average value of idle computing resources of all computing nodes in the stream processing apparatus. In an actual application, the constraint condition may be set according to a specific requirement, which is not limited herein.

It should be noted that in the embodiment of the present invention, if the preset constraint condition is that a computing resource required by a stream processing component is greater than a preset value, or that a computing resource required by a stream processing component is greater than or equal to a greatest idle computing resource that can be provided by all computing nodes in the stream processing apparatus, or that a computing resource required by a stream processing component is greater than or equal to an average value of idle computing resources of all computing nodes in the stream processing apparatus, the stream processing component may obtain, by duplicating a first stream processing component, in a case in which the first stream processing task includes the first stream processing component, where the computing resource required by the first stream processing component meets the preset constraint condition, the second stream processing component that has the same computing logic as the first stream processing component.

204. Allocate a stream processing component in the second stream processing task to a computing node that is in a stream processing system and meets a computing resource required by the stream processing component.

In the embodiment of the present invention, the stream processing apparatus allocates the stream processing component in the obtained second stream processing task to the computing node that is in the stream processing apparatus and meets the computing resource required by the stream processing component. It should be noted that data input and output directions of a data stream on the computing node are consistent with data input and output directions between stream processing components that are allocated to the computing node.

In the embodiment of the present invention, a stream processing apparatus receives a first stream processing task; calculates a computing resource required by each stream processing component in the first stream processing task; if the first stream processing task includes a first stream processing component, where the computing resource required by the first stream processing component does not meet a preset constraint condition, obtains, by duplicating the first stream processing component, a second stream processing component that has same computing logic as the first stream processing component, and adds the second stream processing component to the first stream processing task to obtain a second stream processing task; and allocates a stream processing component in the second stream processing task to a computing node that is in the stream processing apparatus and meets a computing resource required by the stream processing component. At least one second stream processing component having the same computing logic as the first stream processing component that does not meet the constraint condition is obtained by duplicating the first stream processing component; the second stream processing component has a same data input and output relationship as the first stream processing component. Therefore, if a third stream processing component that sends data to the first stream processing component exists in the first stream processing task, the third stream processing component sends the data to the first stream processing component and the second stream processing component according to a first data allocation policy; if a stream data source that corresponds to an identifier of the stream data source and sends data to the first stream processing component exists in the first stream processing task, the stream data source sends, by grouping, the data to the first stream processing component and the second stream processing component according to a second data allocation policy. In this way, the computing resource that is required by the first stream processing component that does not meet the constraint condition may be allocated to the first stream processing component and the second stream processing component, which decreases the computing resource required by the first stream processing component and can effectively reduce a probability that system instability and a data processing fault are caused because a computing resource required by a stream processing component that is allocated to a computing node exceeds a computing resource that can be provided by the computing node, thereby improving system performance.

Figure 4:
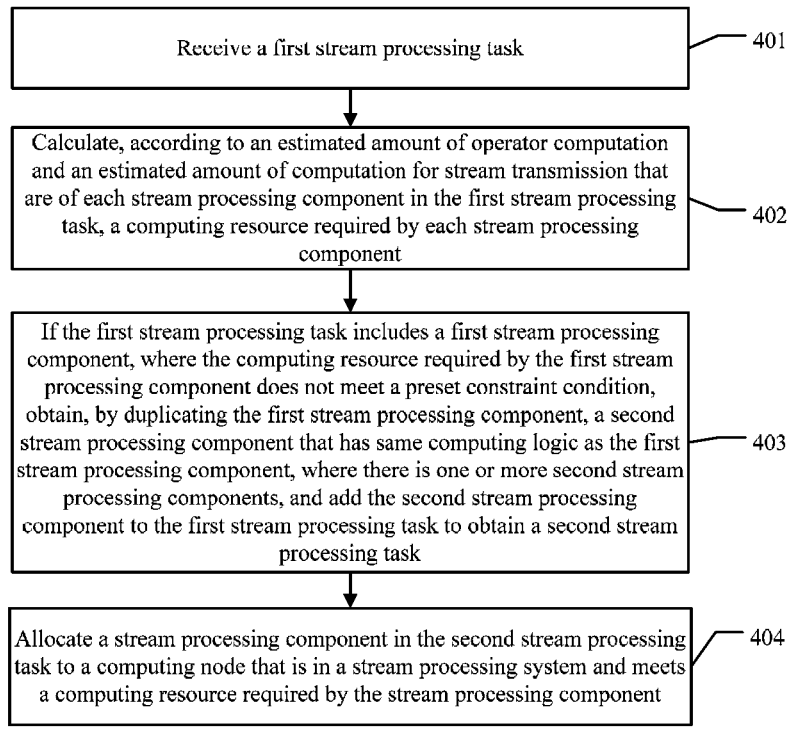
FIG. 4 is another schematic diagram of a stream processing method according to an embodiment of the present invention.

In order to better understand the technical solutions in the embodiments of the present invention, reference may be made to FIG. 4. FIG. 4 shows an embodiment of a stream processing method according to the embodiments of the present invention. The method includes:

401. Receive a first stream processing task.

In the embodiment of the present invention, a stream processing apparatus may receive the first stream processing task submitted by a user. The first stream processing task includes one or more stream processing components, a data input and output relationship of the stream processing component, an identifier of a stream data source, and an estimated amount of operator computation and an estimated amount of computation for stream transmission that are of the stream processing component.

The estimated amount of operator computation refers to an estimated amount of computation required to perform processing on per unit of data according to computing logic of a stream processing component, and the estimated amount of computation for stream transmission refers to an estimated amount of computation required to perform transmission on per unit of data. Per unit of data refers to data transmitted per unit of time, and per unit of data is related to a speed at which a stream data source outputs data.

It should be noted that the estimated amount of operator computation of the stream processing component and the estimated amount of computation for stream transmission of the stream processing component, included in the first stream processing task, may be used to calculate a computing resource required by the stream processing component. If another resource, for example, a memory resource or a network bandwidth resource, of the stream processing component needs to be calculated, a parameter related to a type of the resource that needs to be calculated may be carried in a stream processing task. In the embodiment of the present invention, the technical solution is described by using an example in which a computing resource required by a stream processing component is calculated. In an actual application, the user may set, by setting a parameter in a stream processing task, a specific type of a resource required by a stream processing component, which is not limited herein.

402. Calculate, according to an estimated amount of operator computation and an estimated amount of computation for stream transmission that are of each stream processing component in the first stream processing task, a computing resource required by each stream processing component.

In the embodiment of the present invention, the first stream processing task includes the estimated amount of operator computation of each stream processing component and the estimated amount of computation for stream transmission of the stream processing component. The stream processing apparatus uses the estimated amount of operator computation and the estimated amount of computation for stream transmission that are of each stream processing component in the first stream processing task to calculate the computing resource required by each stream processing component.

It should be noted that in the embodiment of the present invention, a preset prediction function may be used to calculate the computing resource required by each stream processing component. Moreover, a prediction function that needs to be used varies with a type of a resource that needs to be calculated for a stream processing component. In an actual application, prediction functions that need to be used to calculate different resources have been preset in a stream processing component, which is not limited herein.

In the embodiment of the present invention, that the stream processing apparatus calculates the computing resource required by each stream processing component may be:

1) Calculating, according to the estimated amount of operator computation of each stream processing component and an estimated amount of computation for source code of the stream processing component, an amount of operator computation of each stream processing component by using a preset prediction function of an amount of operator computation.

After receiving the stream processing task, the stream processing apparatus may estimate in advance an estimated amount of computation for source code of each stream processing component in the stream processing task. As a reference computing manner, the preset prediction function of the amount of operator computation may be:

$V_i = a*P_i + b*M_i$, where i represents an $i^{th}$ stream processing component in the first stream processing task; a and b are preset adjustment parameters; $V_i$ represents an amount of operator computation of the $i^{th}$ stream processing component; $P_i$ represents an estimated amount of operator computation of the $i^{th}$ stream processing component; $M_i$ represents an estimated amount of computation for source code of the $i^{th}$ stream processing component in the stream processing apparatus.

Preferably, in order to adjust an allocation situation of a stream processing component in a process in which the stream processing apparatus executes a received stream processing task, the stream processing apparatus may further monitor each stream processing component to acquire a monitored amount of operator computation of each stream processing component, and determine, based on the monitored amount of operator computation, the amount of operator computation of the stream processing component. In this case, the preset prediction function of the amount of operator computation may be:

$V_i = a*P_i b*M_i + c*K_i$, where c is a preset adjustment parameter, and $K_i$ represents a monitored amount of operator computation of the $i^{th}$ stream processing component.

2) Obtaining, according to the estimated amount of computation for stream transmission of each stream processing component, an amount of computation for stream transmission of each stream processing component by using a preset prediction function of an amount of computation for stream transmission.

For the prediction function of the amount of computation for stream transmission, reference may be made to the following:

$E_i = d*F_i$, where $E_i$ represents an amount of computation for stream transmission of an $i^{th}$ stream processing component; d is a preset adjustment parameter; and $F_i$ represents an estimated amount of computation for stream transmission of the $i^{th}$ stream processing component.

Preferably, in order to adjust an allocation situation of the stream processing component in the process in which the stream processing apparatus executes a received stream processing task, the stream processing apparatus may further monitor each stream processing component to acquire a monitored amount of computation for stream transmission of each stream processing component, and determine, based on the monitored amount of computation for stream transmission, the amount of computation for stream transmission of the stream processing component. In this case, for the prediction function of the amount of computation for stream transmission, reference may be made to the following:

$E_i = d*F_i + e*G_i$, where e is a preset adjustment parameter, and $G_i$ represents a monitored amount of computation for stream transmission of the $i^{th}$ stream processing component.

3) Using a sum of the amount of operator computation of each stream processing component and the amount of computation for stream transmission of each stream processing component as the computing resource required by each stream processing component.

The stream processing apparatus may use a sum of $E_i$ and $V_i$ as a computing resource required by the $i^{th}$ stream processing component.

403. If the first stream processing task includes a first stream processing component, where the computing resource required by the first stream processing component does not meet a preset constraint condition, obtain, by duplicating the first stream processing component, a second stream processing component that has same computing logic as the first stream processing component, where there is one or more second stream processing components, and add the second stream processing component to the first stream processing task to obtain a second stream processing task.

In the embodiment of the present invention, after obtaining the computing resource required by each stream processing component in the first stream processing task, the stream processing apparatus determines whether the first stream processing task includes the first stream processing component, where the computing resource required by the first stream processing component does not meet the preset constraint condition; and if the first stream processing task does not meet the preset constraint condition, obtains, by duplicating the first stream processing component, the second stream processing component that has the same computing logic as the first stream processing component, where there is one or more second stream processing components, and adds the second stream processing component to the first stream processing task to obtain the second stream processing task. In the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and computing resources required by the first stream processing component and the second stream processing component in the second stream processing task are obtained by dividing, according to a resource allocation policy, the computing resource required by the first stream processing component in the first stream processing task.

It should be noted that the first stream processing component in the embodiment of the present invention may be one stream processing component, or may be multiple stream processing components. Moreover, if there are multiple stream processing components, the stream processing apparatus obtains, by duplicating the first stream processing component for each stream processing component of the multiple stream processing components, a stream processing component that has same computing logic as the stream processing component.

It should be noted that in the embodiment of the present invention, a quantity of second stream processing components that are obtained by duplicating the first stream processing component and have the same computing logic as the first stream processing component may be preset or may be set according to a requirement, which is not limited herein.

404. Allocate a stream processing component in the second stream processing task to a computing node that is in a stream processing system and meets a computing resource required by the stream processing component.

In the embodiment of the present invention, the stream processing apparatus allocates the stream processing component in the second stream processing task to the computing node that is in the stream processing system and meets the computing resource required by the stream processing component, which specifically includes: sorting stream processing components according to a descending order of computing resources required by the stream processing components in the second stream processing task; and allocating, according to the sorting, the stream processing component to the computing node that is in the stream processing system and meets the computing resource required by the stream processing component, where the computing node to which the stream processing component is allocated is a computing node on which the stream processing component has smallest computing resource proportion among all computing nodes, and the computing resource proportion is proportion of a sum of the computing resource required by the stream processing component and a computing resource already used on the computing node to total computing resources of the computing node.

Step 404 is also executed according to the following process:

1) The stream processing apparatus performs sorting according to the descending order of the computing resources required by the stream processing components in the second stream processing task, so as to obtain a sorted stream processing component set S, where an initial value of i is 1, and i is less than or equal to N, where N is a quantity of stream processing components included in the stream processing component set S; and H is a set of computing resources of the computing node. The following step is executed:

2) The stream processing apparatus calculates computing resource proportion of a computing resource required by a stream processing component $S_i$ on each computing node in a set $H_i$.

A formula for calculating the computing resource proportion of the computing resource required by $S_i$ on a $k^{th}$ computing node is:

$$T_{ik} = (B'_k + SCost(S_i))/B_k, \text{ where}$$

$T_{ik}$ represents the computing resource proportion of the stream processing component $S_i$ on the $k^{th}$ computing node in the set $H_i$; $B'_k$ represents a computing resource already used on the $k^{th}$ computing node in the set $H_i$; $B_k$ represents total computing resources of the $k^{th}$ computing node in the set $H_i$; and $SCost(S_i)$ represents the computing resource required by the stream processing component $S_i$.

3) Allocate the stream processing component $S_i$ to a computing node having smallest computing resource proportion in the set $H_i$.

After obtaining the computing resource proportion of the stream processing component $S_i$ on each computing node in the set $H_i$, the stream processing apparatus allocates the stream processing component $S_i$ to the computing node having the smallest computing resource proportion in the set $H_i$.

4) Update the set $H_i$ to obtain an updated set $H_{i+1}$, and on the computing node to which the stream processing component $S_i$ is allocated, a computing resource that is allocated to the stream processing component $S_i$ is a computing resource that is already used. If i is less than N, it is assumed that i=i+1; return to execute the step of calculating the computing resource proportion of the computing resource required by the stream processing component $S_i$ on each computing node in the set $H_i$.

5) If i=N, stop allocation of the stream processing component.

In the embodiment of the present invention, the stream processing apparatus may allocate each stream processing component in the second stream processing task to a computing node according to the foregoing steps 1) to 5), and each computing node can meet a computing resource required by a stream processing component obtained by means of allocation. Moreover, a computing node to which two or more stream processing components are allocated may exist in computing nodes of the stream processing apparatus.

It should be noted that in the embodiment of the present invention, the foregoing steps 1) to 5) are merely one feasible allocation manner of a stream processing component. In an actual application, the stream processing component in the second stream processing task may also be allocated according to a type of the second stream processing task. Therefore, the foregoing allocating a stream processing component in the second stream processing task to a computing node that is in a stream processing apparatus and meets a computing resource required by the stream processing component is specifically: determining a type of the second stream processing task according to a preset classification model; searching a preset mapping relationship table of a task type and an allocation manner to determine an allocation manner corresponding to the type of the second stream processing task; and allocating, for the stream processing component in the second stream processing task according to the corresponding allocation manner, the computing node that meets the computing resource required by the stream processing component. The preset classification model is a model that is obtained based on a feature classification algorithm of multiple stream processing tasks. The classification algorithm may include a decision tree, a Bayes classifier, a support vector machine, and the like. Moreover, in a process of using the classification model to determine a stream processing task, the stream processing apparatus may also improve the classification model by means of learning.

An allocation manner corresponding to a task type may be set according to a specific requirement. The foregoing steps 1) to 5) are one of feasible allocation manners, which is not limited herein.

It should be noted that in the embodiment of the present invention, if a stream processing component that does not meet the preset constraint condition still exists in the second stream processing task in the process in which the stream processing component in the second stream processing task is allocated to the computing node, a stream processing component that has same computing logic as the stream processing component in which computing resource required by the stream processing component does not meet the constraint condition may be further obtained by duplicating the first stream processing component.

In the embodiment of the present invention, after receiving a first stream processing task, a stream processing apparatus uses an estimated amount of operator computation and an estimated amount of computation for stream transmission that are of each stream processing component and included in the first stream processing task to calculate a computing resource required by each stream processing component; and if the first stream processing task includes a first stream processing component, where the computing resource required by the first stream processing component does not meet a preset constraint condition, obtains, by duplicating the first stream processing component, at least one second stream processing component that has same computing logic as the first stream processing component, and adds the second stream processing component to the first stream processing task to obtain a second stream processing task. In the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if a stream data source that corresponds to an identifier of the stream data source and sends data to the first stream processing component exists in the first stream processing task, the stream data source sends, to the first stream component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy. In this way, the data originally sent to the first stream processing component may be allocated to the first stream processing component and the second stream processing component, which decreases the computing resource required by the first stream processing component and can effectively reduce a probability that system instability and a data processing fault are caused because a computing resource required by a stream processing component that is allocated to a computing node exceeds a computing resource that can be provided by the computing node, thereby improving system performance.

Figure 5:
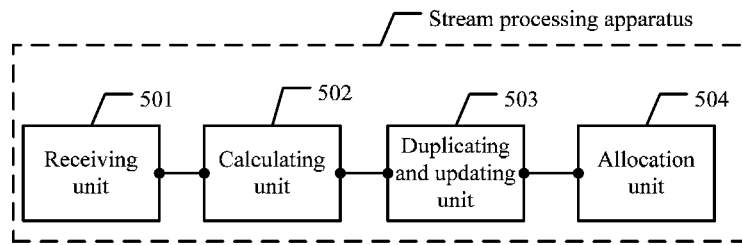
FIG. 5 is a schematic diagram of a structure of a stream processing apparatus according to an embodiment of the present invention.

Referring to FIG. 5, FIG. 5 is a schematic diagram of a structure of a stream processing apparatus according to an embodiment of the present invention. The apparatus includes:

a receiving unit 501, configured to receive a first stream processing task, where the first stream processing task includes one or more stream processing components, a data input and output relationship of the stream processing component, and an identifier of a stream data source;

a calculating unit 502, configured to: after the receiving unit 501 receives the first stream processing task, calculate a computing resource required by each stream processing component of the one or more stream processing components included in the first stream processing task;

a duplicating and updating unit 503, configured to: after the calculating unit 502 obtains the computing resource required by each stream processing component, if the first stream processing task includes a first stream processing component, where the computing resource required by the first stream processing component does not meet a preset constraint condition, obtain, by duplicating the first stream processing component, a second stream processing component that has same computing logic as the first stream processing component, where there is one or more second stream processing components, and add the second stream processing component to the first stream processing task to obtain a second stream processing task; where in the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy; and an allocation unit 504, configured to: after the duplicating and updating unit 503 obtains the second stream processing task, allocate a stream processing component in the second stream processing task to a computing node that is in the stream processing system and meets a computing resource required by the stream processing component.

In the embodiment of the present invention, a receiving unit 501 receives a first stream processing task, where the first stream processing task includes one or more stream processing components, a data input and output relationship of the stream processing component, and an identifier of a stream data source; then, a calculating unit 502 calculates a computing resource required by each stream processing component in the first stream processing task; if the first stream processing task includes a first stream processing component, where the computing resource required by the first stream processing component does not meet a preset constraint condition, a duplicating and updating unit 503 obtains, by duplicating the first stream processing component, at least one second stream processing component that has same computing logic as the first stream processing component, and adds the second stream processing component to the first stream processing task to obtain a second stream processing task; where in the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy; and finally, an allocation unit 504 allocates a stream processing component in the second stream processing task to a computing node that is in the stream processing system and meets a computing resource required by the stream processing component.

In the embodiment of the present invention, a stream processing apparatus receives a first stream processing task; calculates a computing resource required by each stream processing component in the first stream processing task; if the first stream processing task includes a first stream processing component, where the computing resource required by the first stream processing component does not meet a preset constraint condition, obtains, by duplicating the first stream processing component, at least one second stream processing component that has same computing logic as the first stream processing component, and adds the second stream processing component to the first stream processing task to obtain a second stream processing task; and allocates a stream processing component in the second stream processing task to a computing node that is in the stream processing apparatus and meets a computing resource required by the stream processing component. The at least one second stream processing component having the same computing logic as the first stream processing component that does not meet the constraint condition is obtained by duplicating the first stream processing component; the second stream processing component has a same data input and output relationship as the first stream processing component. Therefore, if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if a stream data source that corresponds to an identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy. In this way, the computing resource that is required by the first stream processing component that does not meet the constraint condition may be allocated to the first stream processing component and the second stream processing component, which decreases the computing resource required by the first stream processing component and can effectively reduce a probability that system instability and a data processing fault are caused because a computing resource required by a stream processing component that is allocated to a computing node exceeds a computing resource that can be provided by the computing node, thereby improving system performance.

Figure 6:
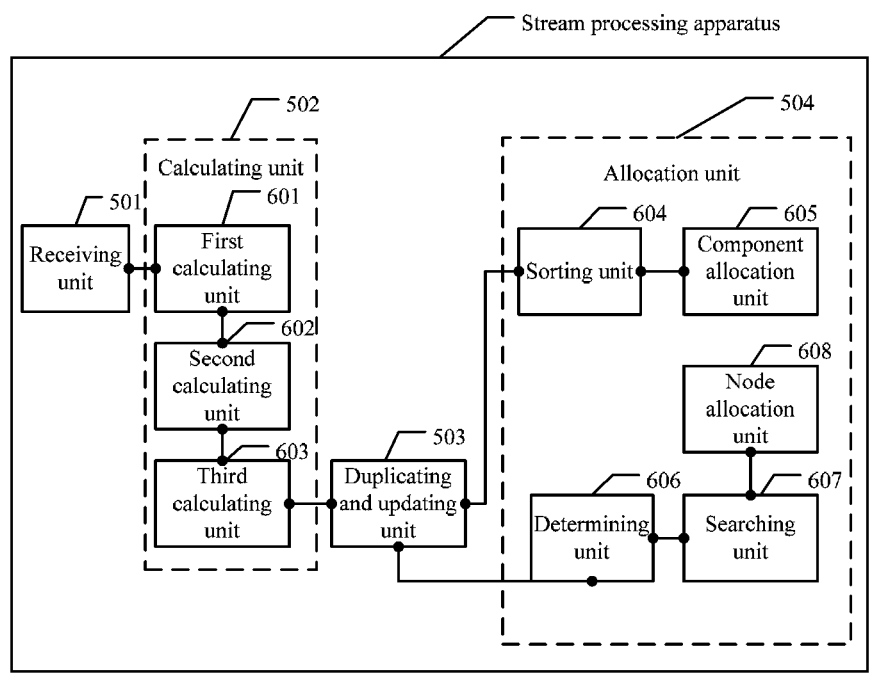
FIG. 6 is another schematic diagram of a structure of a stream processing apparatus according to an embodiment of the present invention.

Referring to FIG. 6, FIG. 6 shows an embodiment of a structure of a stream processing system according to the embodiments of the present invention. The system includes the receiving unit 501, the calculating unit 502, the duplicating and updating unit 503, and the allocation unit 504 that are described in the embodiment shown in FIG. 5. Moreover, a solution in this embodiment is similar to the solution described in the embodiment shown in FIG. 5, and details are not described herein again.

In the embodiment of the present invention, the first stream processing task further includes an estimated amount of operator computation of a stream processing component and an estimated amount of computation for stream transmission of the stream processing component; and the calculating unit 502 is specifically configured to calculate, according to an estimated amount of operator computation of each stream processing component in the first stream processing task and an estimated amount of computation for stream transmission of the stream processing component, the computing resource required by each stream processing component.

The calculating unit 502 includes:

a first calculating unit 601, configured to: after the receiving unit 501 receives the first stream processing task, calculate, according to the estimated amount of operator computation of each stream processing component and an estimated amount of computation for source code of the stream processing component, an amount of operator computation of each stream processing component by using a preset prediction function of an amount of operator computation;

a second calculating unit 602, configured to: after the first calculating unit 601 calculates the amount of operator computation of each stream processing component, calculate, according to the estimated amount of computation for stream transmission of each stream processing component, an amount of computation for stream transmission of each stream processing component by using a preset prediction function of an amount of computation for stream transmission; and a third calculating unit 603, configured to: after the second calculating unit 602 calculates the amount of computation for stream transmission of each stream processing component, use a sum of the amount of operator computation of each stream processing component and the amount of computation for stream transmission of each stream processing component as the computing resource required by each stream processing component.

In the embodiment of the present invention, the allocation unit 504 includes:

a sorting unit 604, configured to: after the duplicating and updating unit 503 obtains the second stream processing task, perform sorting according to a descending order of computing resources required by stream processing components in the second stream processing task; and a component allocation unit 605, configured to: after the sorting unit 604 performs sorting, allocate, according to the sorting, the stream processing component to the computing node that is in the stream processing system and meets the computing resource required by the stream processing component, where the computing node is a computing node on which the stream processing component has smallest computing resource proportion among all computing nodes, and the computing resource proportion is proportion of a sum of the computing resource required by the stream processing component and a computing resource already used on the computing resource node to total computing resources of the computing node.

Alternatively, in the embodiment of the present invention, the allocation unit includes:

a determining unit 606, configured to: after the duplicating and updating unit 503 obtains the second stream processing task, determine a type of the second stream processing task by using a preset classification model;

a searching unit 607, configured to: after the determining unit 606 determines the type of the second stream processing task, search a preset mapping relationship table of a task type and an allocation manner to determine an allocation manner corresponding to the type of the second stream processing task; and a node allocation unit 608, configured to: after the searching unit 607 determines the corresponding allocation manner, allocate, for the stream processing component in the second stream processing task according to the corresponding allocation manner, the computing node that meets the computing resource required by the stream processing component.

In the embodiment of the present invention, a receiving unit 501 receives a first stream processing task, where the first stream processing task includes one or more stream processing components, a data input and output relationship of the stream processing component, and an identifier of a stream data source. Then, a calculating unit 502 calculates a computing resource required by each stream processing component in the first stream processing task. Specifically, a first calculating unit 601 in the calculating unit 502 calculates, according to an estimated amount of operator computation of each stream processing component and an estimated amount of computation for source code of the stream processing component, an amount of operator computation of each stream processing component by using a preset prediction function of an amount of operator computation; a second calculating unit 602 then calculates, according to an estimated amount of computation for stream transmission of each stream processing component, an amount of computation for stream transmission of each stream processing component by using a preset prediction function of an amount of computation for stream transmission; and a third calculating unit 603 obtains, according to the amount of operator computation of each stream processing component and the amount of computation for stream transmission of each stream processing component, the computing resource required by each stream processing component.

Moreover, if the first stream processing task includes a first stream processing component, where the computing resource required by the first stream processing component does not meet a preset constraint condition, a duplicating and updating unit 503 obtains, by duplicating the first stream processing component, at least one second stream processing component that has same computing logic as the first stream processing component, and adds the second stream processing component to the first stream processing task to obtain a second stream processing task. In the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy. Finally, an allocation unit 504 allocates a stream processing component in the second stream processing task to a computing node that is in the stream processing system and meets a computing resource required by the stream processing component.

The allocation unit 504 may allocate the stream processing component in the following manner a sorting unit 604 performs sorting according to a descending order of computing resources required by stream processing components in the second stream processing task; and an allocation unit 605 allocates, according to the sorting, the stream processing component to the computing node that is in the stream processing system and meets the computing resource required by the stream processing component, where the computing node is a computing node on which the stream processing component has smallest computing resource proportion among all computing nodes, and the computing resource proportion is proportion of a sum of the computing resource required by the stream processing component and a computing resource already used on the computing resource node to total computing resources of the computing node.

Alternatively, the allocation unit 504 may allocate the stream processing component in the following manner a determining unit 606 determines a type of the second stream processing task by using a preset classification model; then a searching unit 607 searches a preset mapping relationship table of a task type and an allocation manner to determine an allocation manner corresponding to the type of the second stream processing task; and a node allocation unit 608 allocates, for the stream processing component in the second stream processing task according to the corresponding allocation manner, the computing node that meets the computing resource required by the stream processing component.

In the embodiment of the present invention, after receiving a first stream processing task, a stream processing apparatus uses an estimated amount of operator computation and an estimated amount of computation for stream transmission that are of each stream processing component and included in the first stream processing task to calculate a computing resource required by each stream processing component; and if the first stream processing task includes a first stream processing component, where the computing resource required by the first stream processing component does not meet a preset constraint condition, obtains, by duplicating the first stream processing component, at least one second stream processing component that has same computing logic as the first stream processing component, and adds the second stream processing component to the first stream processing task to obtain a second stream processing task. In the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy. In this way, the data originally sent to the first stream processing component may be allocated to the first stream processing component and the second stream processing component, which decreases the computing resource required by the first stream processing component and can effectively reduce a probability that system instability and a data processing fault are caused because a computing resource required by a stream processing component that is allocated to a computing node exceeds a computing resource that can be provided by the computing node, thereby improving system performance.

Figure 7:
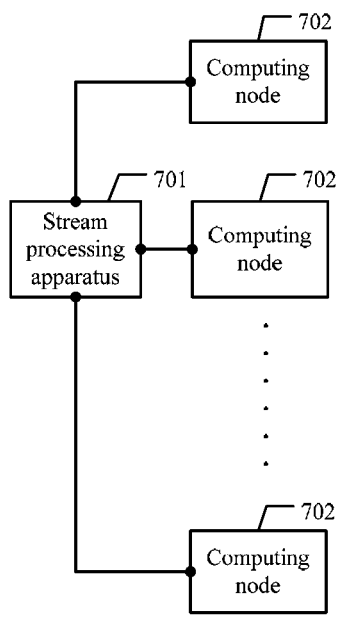
FIG. 7 is a schematic diagram of a structure of a stream processing system according to an embodiment of the present invention.

Referring to FIG. 7, FIG. 7 is a structural diagram of a stream processing system according to an embodiment of the present invention. The system includes:

a stream processing apparatus 701 and multiple computing nodes 702. The computing node provided in the embodiment of the present invention may be a cloud server in a cloud computing center, a data processing server in an ordinary data processing center, a data processing serer in a big data processing center, or the like, which is not limited in the embodiment of the present invention.

The stream processing apparatus 701 is configured to: receive a first stream processing task, where the first stream processing task includes one or more stream processing components, a data input and output relationship of the stream processing component, and an identifier of a stream data source; calculate a computing resource required by each stream processing component in the first stream processing task; if the first stream processing task includes a first stream processing component, where the computing resource required by the first stream processing component does not meet a preset constraint condition, obtain, by duplicating the first stream processing component, at least one second stream processing component that has same computing logic as the first stream processing component, and add the second stream processing component to the first stream processing task to obtain a second stream processing task; where in the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy; and allocate a stream processing component in the second stream processing task to a computing node that meets a computing resource required by the stream processing component.

The computing node 702 is configured to: receive a stream processing component allocated by the stream processing apparatus 701, and process, according to computing logic of the stream processing component, data that is sent to the stream processing component.

In the embodiment of the present invention, the first stream processing task further includes an estimated amount of operator computation and an estimated amount of computation for stream transmission that are of a stream processing component. In this case, the stream processing component is specifically configured to: calculate, according to an estimated amount of operator computation of each stream processing component and an estimated amount of computation for source code of the stream processing component, an amount of operator computation of each stream processing component by using a preset prediction function of an amount of operator computation; calculate, according to an estimated amount of computation for stream transmission of each stream processing component, an amount of computation for stream transmission of each stream processing component by using a preset prediction function of an amount of computation for stream transmission; and use a sum of the amount of operator computation of each stream processing component and the amount of computation for stream transmission of each stream processing component as the computing resource required by each stream processing component.

In the embodiment of the present invention, the first data allocation policy may be an average allocation policy, the second data allocation policy may be an average allocation policy, and the resource allocation policy may be an average allocation policy. Another allocation policy may be used in another embodiment, which is not described herein again.

In the embodiment of the present invention, the constraint condition is that the computing resource required by a stream processing component is less than or equal to a preset value, or that the computing resource required by the stream processing component is less than a greatest idle computing resource among all idle computing resources that can be provided by all computing nodes, or that the computing resource required by the stream processing component is less than an average value of idle computing resources of all computing nodes.

It should be noted that for another function, specific implementation of the function, module division, or the like of the stream processing apparatus 701, reference may be made to the foregoing embodiments.

It can be seen that in the embodiment of the present invention, a stream processing apparatus 701 receives a first stream processing task; calculates a computing resource required by each stream processing component in the first stream processing task; if the first stream processing task includes a first stream processing component, where the computing resource required by the first stream processing component does not meet a preset constraint condition, obtains, by duplicating the first stream processing component, at least one second stream processing component that has same computing logic as the first stream processing component, and adds the second stream processing component to the first stream processing task to obtain a second stream processing task; and allocates a stream processing component in the second stream processing task to a computing node that is in the stream processing apparatus and meets a computing resource required by the stream processing component. The at least one second stream processing component having the same computing logic as the first stream processing component that does not meet the constraint condition is obtained by duplicating the first stream processing component; the second stream processing component has a same data input and output relationship as the first stream processing component. Therefore, if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if a stream data source that corresponds to an identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy. In this way, data that needs to be processed by the first stream processing component is decreased and the computing resource that is needed is also decreased, which can effectively reduce a probability that system instability and a data processing fault are caused because a computing resource required by a stream processing component that is allocated to a computing node exceeds a computing resource that can be provided by the computing node, thereby improving system performance.

Figure 8:
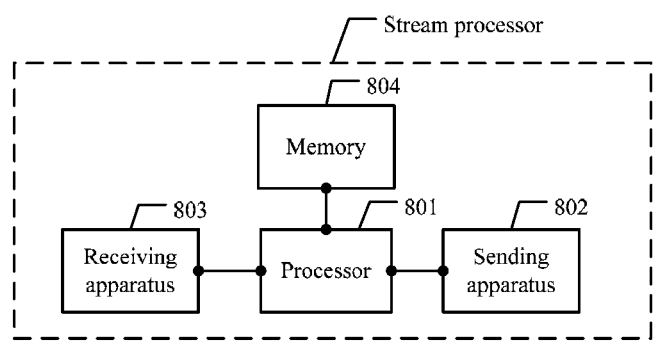
FIG. 8 is another schematic diagram of a structure of a stream processing apparatus according to an embodiment of the present invention.

Referring to FIG. 8, FIG. 8 shows an embodiment of a structure of a stream processor according to the embodiments of the present invention. The stream processor includes:

a processor 801, a receiving apparatus 802, a sending apparatus 803, and a memory 804.

The receiving apparatus 802 is configured to receive a first stream processing task, where the first stream processing task includes one or more stream processing components, a data input and output relationship of the stream processing component, and an identifier of a stream data source.

The memory 804 is configured to store a computer program. The processor 801 is configured to read the computer program stored in the memory and perform the following processing: calculating a computing resource required by each stream processing component in the first stream processing task; if the first stream processing task includes a first stream processing component, where the computing resource required by the first stream processing component does not meet a preset constraint condition, obtaining, by duplicating the first stream processing component, at least one second stream processing component that has same computing logic as the first stream processing component, and adding the second stream processing component to the first stream processing task to obtain a second stream processing task; where in the second stream processing task, the second stream processing component has a same data input and output relationship as the first stream processing component; if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if the stream data source that corresponds to the identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy; and allocating a stream processing component in the second stream processing task to a computing node that meets a computing resource required by the stream processing component.

Specifically, as an embodiment, the processor 801 is specifically configured to calculate the computing resource required by each stream processing component in the first stream processing task according to a preset prediction function. The prediction function may be set according to an actual situation, which is not limited in the embodiment of the present invention.

Optionally, as an embodiment, the processor 801 is further configured to: if the first stream processing task further includes an estimated amount of operator computation and an estimated amount of computation for stream transmission that are of a stream processing component, calculate, according to an estimated amount of operator computation and an estimated amount of computation for stream transmission that are of each stream processing component in the first stream processing task, the computing resource required by each stream processing component.

Further, the processor 801 is further configured to: calculate, according to the estimated amount of operator computation of each stream processing component and an estimated amount of computation for source code of the stream processing component, an amount of operator computation of each stream processing component by using a preset prediction function of an amount of operator computation;

calculate, according to the estimated amount of computation for stream transmission of each stream processing component, an amount of computation for stream transmission of each stream processing component by using a preset prediction function of an amount of computation for stream transmission; and use a sum of the amount of operator computation of each stream processing component and the amount of computation for stream transmission of each stream processing component as the computing resource required by each stream processing component.

As an optional embodiment, the processor 801 is further configured to: sort stream processing components according to a descending order of computing resources required by the stream processing components in the second stream processing task; and allocate, according to the sorting, the stream processing component to the computing node that is in a stream processing system and meets the computing resource required by the stream processing component, where the computing node is a computing node on which the stream processing component has smallest computing resource proportion among all computing nodes, and the computing resource proportion is proportion of a sum of the computing resource required by the stream processing component and a computing resource already used on the computing node to total computing resources of the computing node.

As an optional embodiment, the processor 801 is further configured to: determine a type of the second stream processing task according to a preset classification model; search a preset mapping relationship table of a task type and an allocation manner to determine an allocation manner corresponding to the type of the second stream processing task; and allocate, for the stream processing component in the second stream processing task according to the allocation manner, the computing node that meets the computing resource required by the stream processing component.

Further, the foregoing constraint condition is that the computing resource required by a stream processing component is less than or equal to a preset value, or that the computing resource required by the stream processing component is less than a greatest idle computing resource among all idle computing resources that can be provided by all computing nodes, or that the computing resource required by the stream processing component is less than an average value of idle computing resources of all computing nodes.

In the embodiment of the present invention, the first data allocation policy may be an average allocation policy, the second data allocation policy may be an average allocation policy, and the resource allocation policy may be an average allocation policy. Another allocation policy may be used in another embodiment, which is not described herein again.

The sending apparatus 803 is configured to send the stream processing component in the second stream processing task to the computing node to which the stream processing component is allocated.

The memory 804 may be further configured to store the first stream processing task, the second stream processing task, an identifier of the computing node, and the computing resource that is already used and the total computing resources of the computing node.

It can be seen that after the foregoing solution is used, after receiving a first stream processing task, a stream processor uses an estimated amount of operator computation and an estimated amount of computation for stream transmission that are of each stream processing component and included in the first stream processing task to calculate a computing resource required by each stream processing component; and if the first stream processing task includes a first stream processing component, where the computing resource required by the first stream processing component does not meet a preset constraint condition, obtains, by duplicating the first stream processing component, at least one second stream processing component that has same computing logic as the first stream processing component, and adds the second stream processing component to the first stream processing task to obtain a second stream processing task. In the second stream processing task, the second stream processing component has a same data input and output relationship as the first stream processing component. Therefore, if a third stream processing component that sends data to the first stream processing component exists in the first stream processing task, the third stream processing component sends, to the first stream processing component and the second stream processing component according to a first data allocation policy, the data to be sent by the third stream processing component to the first stream processing component; if a stream data source that corresponds to an identifier of the stream data source and sends data to the first stream processing component exists in the first stream processing task, the stream data source sends, to the first stream processing component and the second stream processing component according to a second data allocation policy, the data to be sent by the stream data source to the first stream processing component; and the computing resource required by the first stream processing component in the first stream processing task is divided for the first stream processing component and the second stream processing component in the second stream processing task according to a resource allocation policy. In this way, the data originally sent to the first stream processing component may be allocated to the first stream processing component and the second stream processing component, which decreases the computing resource required by the first stream processing component and can reduce, to a certain degree, a probability that system instability and a data processing fault are caused because a computing resource required by a stream processing component that is allocated to a computing node exceeds a computing resource that can be provided by the computing node, thereby improving system performance.

It should be noted that the foregoing stream processor may be applied to a personal computer or a server.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. A person of ordinary skill in the art may understand and implement the embodiments of the present invention without creative efforts.

Based on the foregoing descriptions of the embodiments, a person skilled in the art may clearly understand that the present invention may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A stream processing method for a stream processing system, wherein the method comprises:

receiving, by a stream processing apparatus, a first stream processing task, wherein the first stream processing task comprises one or more stream processing components, a data input and output relationship of the one or more stream processing components, and an identifier of a stream data source;

calculating, by the stream processing apparatus, a computing resource required by each stream processing component of the one or more stream processing components comprised in the first stream processing task;

wherein the one or more stream processing components of the first stream processing task comprises a first stream processing component, wherein the computing resource required by the first stream processing component does not meet a preset constraint condition;

wherein the method further comprises: obtaining, by duplicating the first stream processing component, one or more second stream processing components, wherein each of the one or more second stream processing components has the same computing logic as the first stream processing component and the same data input and output relationship as the first stream processing component, and adding the one or more second stream processing components to the first stream processing task to obtain a second stream processing task;

wherein the one or more stream processing components of the first stream processing task further comprises a third stream processing component configured for sending data to the first stream processing component, and wherein the third stream processing component sends, to the first stream processing component and the one or more second stream processing components, according to a first data allocation policy, the data to be sent by the third stream processing component to the first stream processing component;

wherein the first stream processing task comprises the stream data source that corresponds to the identifier of the stream data source, the stream data source being configured for sending data to the first stream processing component, and wherein the stream data source sends, to the first stream processing component and the one or more second stream processing components, according to a second data allocation policy, the data to be sent by the stream data source to the first stream processing component;

wherein the computing resource required by the first stream processing component in the first stream processing task is divided for the first stream processing component and the one or more second stream processing components according to a resource allocation policy; and wherein the method further comprises: allocating each stream processing component in the second stream processing task to a computing node that is in the stream processing system and that meets a computing resource required by the stream processing component.

2. The method according to claim 1, wherein the first stream processing task further comprises an estimated amount of operator computation and an estimated amount of computation for stream transmission for each stream processing component of the one or more stream processing components comprised in the first stream processing task; and wherein calculating the computing resource required by each stream processing component of the one or more stream processing components comprised in the first stream processing task is based on the estimated amount of operator computation and the estimated amount of computation for stream transmission corresponding to each respective stream processing component of the one or more stream processing components comprised in the first stream processing task.

3. The method according to claim 2, wherein calculating the computing resource required by each stream processing component of the one or more stream processing components comprised in the first stream processing task comprises:
   calculating, according to the estimated amount of operator computation of each stream processing component and an estimated amount of computation for source code of the stream processing component, an amount of operator computation of each stream processing component by using a preset prediction function of an amount of operator computation; and
   calculating, according to the estimated amount of computation for stream transmission of each stream processing component, an amount of computation for stream transmission of each stream processing component by using a preset prediction function of an amount of computation for stream transmission;
   wherein a sum of the amount of operator computation of each stream processing component and the amount of computation for stream transmission of each stream processing component is the computing resource required by each stream processing component.

4. The method according to claim 1, wherein allocating the stream processing components in the second stream processing task to respective computing nodes comprises:
   sorting the stream processing components according to an order of computing resources required by the stream processing components;
   wherein the allocating is based on the sorting, wherein allocation priority is given to a computing node on which the stream processing component has a smallest computing resource proportion among all computing nodes, the computing resource proportion being a proportion of a sum of the computing resource required by the stream processing component and a computing resource already used on the computing node to total computing resources of the computing node.

5. The method according to claim 1, wherein allocating the stream processing components in the second stream processing task to respective computing nodes comprises:
   determining a type of the second stream processing task according to a preset classification model; and
   searching a preset mapping relationship table of a task type and an allocation manner to determine an allocation manner corresponding to the type of the second stream processing task;
   wherein the allocating is based on the allocation manner.

6. The method according to claim 1, wherein the constraint condition is that:
   the computing resource required by a stream processing component is less than or equal to a preset value, or
   the computing resource required by the stream processing component is less than a greatest idle computing resource among all idle computing resources that can be provided by all computing nodes, or
   the computing resource required by the stream processing component is less than an average value of idle computing resources of all computing nodes.

7. The method according to claim 1, wherein the first data allocation policy is an average allocation policy, the second data allocation policy is an average allocation policy, and the resource allocation policy is an average allocation policy.

8. A stream processing system, comprising:
   a stream processing apparatus, comprising a processor and a non-transitory processor-readable medium; and
   multiple computing nodes, each computing node comprising a processor and a non-transitory processor-readable medium;
   wherein the stream processing apparatus is configured to:
      receive a first stream processing task, wherein the first stream processing task comprises one or more stream processing components, a data input and output relationship of the one or more stream processing components, and an identifier of a stream data source; and
      calculate a computing resource required by each stream processing component of the one or more stream processing components comprised in the first stream processing task;
   wherein the one or more stream processing components of the first stream processing task comprises a first stream processing component, wherein the computing resource required by the first stream processing component does not meet a preset constraint condition;
   wherein the stream processing apparatus is further configured to:
      obtain, by duplicating the first stream processing component, one or more second stream processing components, wherein each of the one or more second stream processing components has the same computing logic as the first stream processing component and the same data input and output relationship as the first stream processing component; and
      add the one or more second stream processing components to the first stream processing task to obtain a second stream processing task;
   wherein the one or more stream processing components of the first stream processing task further comprises a third stream processing component configured for sending data to the first stream processing component, the third stream processing component being configured to send, to the first stream processing component and the one or more second stream processing components according to a first data allocation policy, the data to be sent by the third stream processing component to the first stream processing component;
   wherein the first stream processing task comprises the stream data source that corresponds to the identifier of the stream data source, the stream data source being configured for sending data to the first stream processing component and being further configured to send, to the first stream processing component and the one or more second stream processing components according to a second data allocation policy, the data to be sent by the stream data source to the first stream processing component;
   wherein the computing resource required by the first stream processing component in the first stream processing task is divided for the first stream processing component and the one or more second stream processing components according to a resource allocation policy; and
   wherein the multiple computing nodes are configured to:
      receive a stream processing component allocated by the stream processing apparatus, and process, according to computing logic of the stream processing component, data that is sent to the stream processing component.

9. The system according to claim 8, wherein the first stream processing task further comprises an estimated amount of operator computation and an estimated amount of computation for stream transmission for each stream processing component of the one or more stream processing components of the first stream processing task;

wherein the stream processing apparatus is further configured to: calculate, according to an estimated amount of operator computation of each stream processing component and an estimated amount of computation for source code of the stream processing component, an amount of operator computation of each stream processing component by using a preset prediction function of an amount of operator computation; and calculate, according to an estimated amount of computation for stream transmission of each stream processing component, an amount of computation for stream transmission of each stream processing component by using a preset prediction function of an amount of computation for stream transmission; and wherein a sum of the amount of operator computation of each stream processing component and the amount of computation for stream transmission of each stream processing component is the computing resource required by each stream processing component.

10. The system according to claim 8, wherein the constraint condition is that:

the computing resource required by a stream processing component is less than or equal to a preset value, or the computing resource required by the stream processing component is less than a greatest idle computing resource among all idle computing resources that can be provided by all computing nodes, or the computing resource required by the stream processing component is less than an average value of idle computing resources of all computing nodes.

11. The system according to claim 8, wherein the first data allocation policy is an average allocation policy, the second data allocation policy is an average allocation policy, and the resource allocation policy is an average allocation policy.

12. A non-transitory processor-readable medium having processor-executable instructions stored thereon for stream processing, wherein the processor-executable instructions, when executed by a processor, are configured to facilitate performance of the following:

receiving, by a stream processing apparatus, a first stream processing task, wherein the first stream processing task comprises one or more stream processing components, a data input and output relationship of the one or more stream processing components, and an identifier of a stream data source;

calculating, by the stream processing apparatus, a computing resource required by each stream processing component of the one or more stream processing components comprised in the first stream processing task;

wherein the one or more stream processing components of the first stream processing task comprises a first stream processing component, wherein the computing resource required by the first stream processing component does not meet a preset constraint condition;

wherein the processor-executable instructions, when executed, are further configured to facilitate: obtaining, by duplicating the first stream processing component, one or more second stream processing components, wherein each of the one or more second stream processing components has the same computing logic as the first stream processing component and the same data input and output relationship as the first stream processing component, and adding the one or more second stream processing components to the first stream processing task to obtain a second stream processing task;

wherein the one or more stream processing components of the first stream processing task further comprises a third stream processing component configured for sending data to the first stream processing component, and wherein the third stream processing component sends, to the first stream processing component and the one or more second stream processing components, according to a first data allocation policy, the data to be sent by the third stream processing component to the first stream processing component;

wherein the first stream processing task comprises the stream data source that corresponds to the identifier of the stream data source, the stream data source being configured for sending data to the first stream processing component, and wherein the stream data source sends, to the first stream processing component and the one or more second stream processing components, according to a second data allocation policy, the data to be sent by the stream data source to the first stream processing component;

wherein the computing resource required by the first stream processing component in the first stream processing task is divided for the first stream processing component and the one or more second stream processing components according to a resource allocation policy; and wherein the processor-executable instructions, when executed, are further configured to facilitate: allocating each stream processing component in the second stream processing task to a computing node that is in the stream processing system and that meets a computing resource required by the stream processing component.

13. The non-transitory processor-readable medium according to claim 12, wherein the first stream processing task further comprises an estimated amount of operator computation and an estimated amount of computation for stream transmission for each stream processing component of the one or more stream processing components comprised in the first stream processing task; and wherein calculating the computing resource required by each stream processing component of the one or more stream processing components comprised in the first stream processing task is based on the estimated amount of operator computation and the estimated amount of computation for stream transmission corresponding to each respective stream processing component of the one or more stream processing components comprised in the first stream processing task.

14. The non-transitory processor-readable medium according to claim 13, wherein calculating the computing resource required by each stream processing component of the one or more stream processing components comprised in the first stream processing task comprises:

calculating, according to the estimated amount of operator computation of each stream processing component and an estimated amount of computation for source code of the stream processing component, an amount of operator computation of each stream processing component by using a preset prediction function of an amount of operator computation; and calculating, according to the estimated amount of computation for stream transmission of each stream processing component, an amount of computation for stream transmission of each stream processing component by using a preset prediction function of an amount of computation for stream transmission;

wherein a sum of the amount of operator computation of each stream processing component and the amount of computation for stream transmission of each stream processing component is the computing resource required by each stream processing component.

15. The non-transitory processor-readable medium according to claim 12, wherein allocating the stream processing components in the second stream processing task to respective computing nodes comprises:

sorting the stream processing components according to an order of computing resources required by the stream processing components;

wherein the allocating is based on the sorting, wherein allocation priority is given to a computing node on which the stream processing component has a smallest computing resource proportion among all computing nodes, the computing resource proportion being a proportion of a sum of the computing resource required by the stream processing component and a computing resource already used on the computing node to total computing resources of the computing node.

16. The non-transitory processor-readable medium according to claim 12, wherein allocating the stream processing components in the second stream processing task to respective computing nodes comprises:

determining a type of the second stream processing task according to a preset classification model; and searching a preset mapping relationship table of a task type and an allocation manner to determine an allocation manner corresponding to the type of the second stream processing task;

wherein the allocating is based on the allocation manner.

17. The non-transitory processor-readable medium according to claim 12, wherein the constraint condition is that:

the computing resource required by a stream processing component is less than or equal to a preset value, or the computing resource required by the stream processing component is less than a greatest idle computing resource among all idle computing resources that can be provided by all computing nodes, or the computing resource required by the stream processing component is less than an average value of idle computing resources of all computing nodes.

18. The non-transitory processor-readable medium according to claim 12, wherein the first data allocation policy is an average allocation policy, the second data allocation policy is an average allocation policy, and the resource allocation policy is an average allocation policy.

* * * * *